June 8, 1965 J. D. GOODELL 3,188,091

TAPE CARTRIDGE INTERLOCK

Filed Nov. 10, 1960 2 Sheets-Sheet 1

INVENTOR
JOHN D. GOODELL
BY
Brumbaugh, Free, Graves & Donohue
HIS ATTORNEYS

INVENTOR
JOHN D. GOODELL
BY
Brumbaugh, Free, Graves & Donohue
HIS ATTORNEYS

United States Patent Office 3,188,091

Patented June 8, 1965

3,188,091

TAPE CARTRIDGE INTERLOCK

John D. Goodell, Silver Spring, Md., assignor to Minnesota Mining & Manufacturing Company, St. Paul, Minn., a corporation of Delaware Filed Nov. 10, 1960, Ser. No. 68,383

9 Claims. (Cl. 274—11)

This invention relates to recording-reproducing apparatus utilizing magnetic tapes, and, more specifically, to new and improved mechanisms for supporting and automatically changing magnetic tape cartridges for apparatus of this type.

The present invention has particular usefulness in connection with the recording and reproducing apparatus described in copending application Serial No. 837,716, filed September 2, 1959, now Patent No. 3,100,090, entitled "Magnetic Tape Changer Mechanism." In that application, there is described a tape recording-reproducing apparatus capable of playing automatically in succession, a plurality of rolls of magnetic tape in a manner comparable to the automatic playing and changing of disc records and the use of record changing mechanisms. It was pointed out in the copending application that a principal disadvantage in conventional magnetic tape machines is the inability of the machine to play automatically, in succession, a plurality of rolls of tape. For instance, conventional tapes must be threaded by hand through a tape transport path onto a tape take-up spool and manually cycled through the usual stages, viz., stop, and rewind.

The present invention relates to an improved arrangement for receiving a stack of cartridges containing rolls of magnetic tapes to be played, for automatically changing the cartridges in succession for automatic play, and for locking the cartridge being played against inadvertent displacement of the cartridge from the playing position. Essentially, the improved mechanism of the invention comprises a platform normally urged upwardly by a spring means, but adapted to be pushed downwardly when tape cartridges are placed thereon and retained releasably in the downward position by escapement means cooperating with the cartridges. Means are provided so that each cartridge is moved successively into playing position, at which time a coupling member on a tape leader automatically engages a coupling element on the tape to draw the tape through the recording and reproducing elements.

Principal features of the invention reside in the provision of an improved arrangement for automatically locking the cartridges in the playing position during the playing cycle against inadvertent displacement or changing of the cartridges. The invention also provides means for automatically locking the coupling member and the tape leader during loading or changing of cartridges, and for insuring that only one cartridge is moved upwardly into the playing position at any one time. For instance, the locking mechanism prevents one operating the machine from accidentally attempting to load the machine and moving a cartridge being played downwardly out of the playing position.

Further objects and advantages of the invention will become apparent upon consideration of the specification and the following accompanying drawings, in which.

Figure 1:
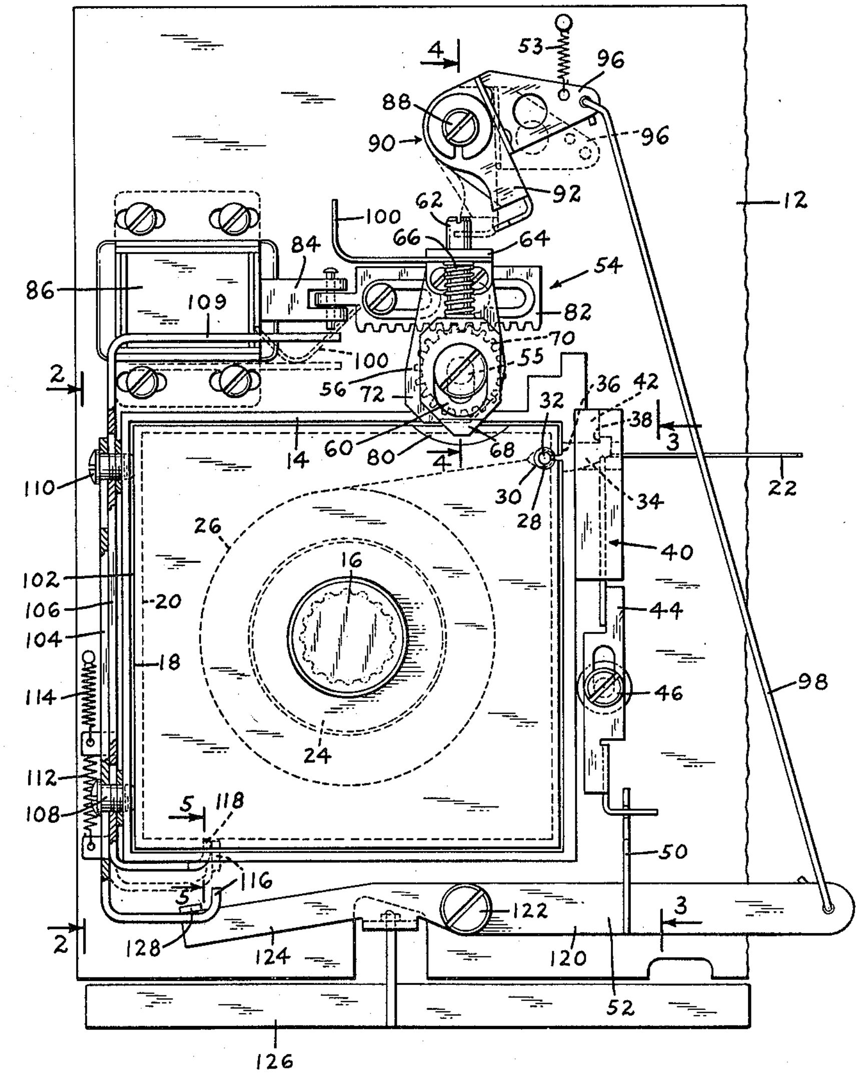
FIGURE 1 is a plan view of a mechanism according to the present invention.

Referring to FIGURE 1, there is placed on one side of a cabinet 12, a substantially rectangular tape cartridge loading well 14 vertically recessed into the cabinet and having an upwardly extending central, cartridge, loading post 16, secured to a bottom wall (not shown) of the well. Slidably mounted on the loading post is a loading platform 18 which is urged in an upward direction by a spring 17, and which is of a substantially rectangular shape so as to be movable in the space formed by the walls of the well 14.

Cartridges 20 (in phantom lines) which are desired to be played are arranged in a stack on the platform so as to be indexed successively by an indexing mechanism to a playing position at the level of a tape leader 22, the latter being secured to a suitable take-up reel (not shown). The cartridges 20 are preferably comprised of shallow rectangular shaped containers of substantially the same size as the loading platform 18 and support internally rotatable hub members 24 onto which spools of magnetic tape 26 are wound. Means are provided so that the hub members 24 are keyed to the shaft, the shaft having means by which it may be driven to rewind the tape onto the spools. Details of a suitable cartridge are described in copending application Ser. No. 834,812, filed August 19, 1959, now Patent No. 3,092,346 and entitled "Magnetic Tape Magazine." Essentially, the cartridge is arranged so that the free ends of the spools of tape are adapted to pass over a guide and to terminate in a coupling element 28. The coupling element is snugly received within a recess 30 of similar shape formed adjacent one corner of the cartridge, and is positioned so that it is in substantial registry with a coupling member 32 of a pull member 34 on the end of the tape leader 22. As illustrated in FIGURE 1, the pull member 34 is provided with shoulders 36 and 38 abutting and cooperating with a suitable stop 42 on the frame, and a reciprocating lock 40 is provided to hold the pull member 34 against the stop 42 whereby the pull member is accurately and securely held in place against cooperating portions of the well 14 during the loading or changing of cartridges.

The pull member 34 is, however, only releasably retained by the lock 40, so that when, after loading, a cartridge is moved up into the play position and coupling member 32 is engaged by the coupling element 28, the pull member 34 may be released permitting the tape to be played.

Figure 3:
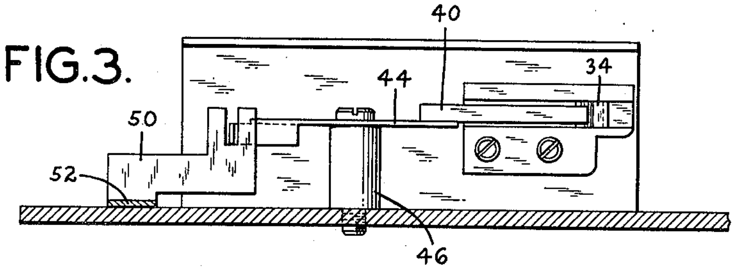
FIGURE 3 is a side and partial section view taken along line 3—3 of Figure 1.

Details of the lock 40 are illustrated in FIGURES 1 and 3, and comprise essentially a reciprocating locking arm 44 slidably mounted on a post 46, the latter being seated on the machine adjacent the well 14. Slidably engaging an end of the locking arm opposite from the end which locks the pull member 34, is a linkage 50 forming a part of a pivoting actuating lever arm 52. The locking arm is spring biased by spring 53 linked to the actuating arm 52 to be normally positioned up against the pull member in the locking position illustrated.

Figure 4:
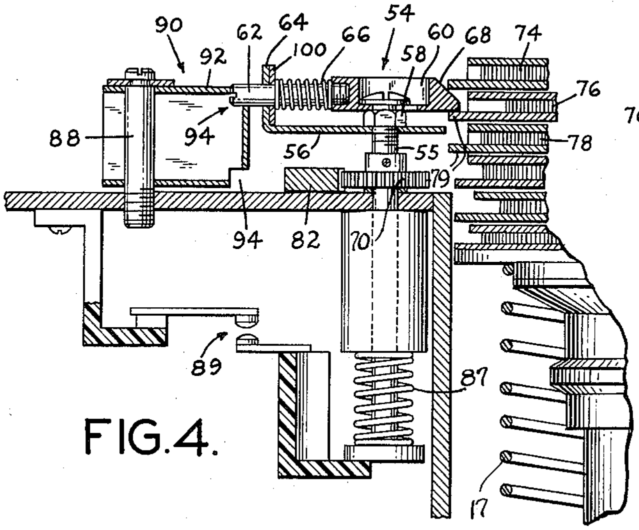
FIGURE 4 is a section view taken along line 4—4 of FIGURE 1.

The cartridges in a stack on the platform are arranged to be indexed successively to a playing position at the level of the tape leader by a suitable escapement or indexing mechanism 54, illustrated in FIGURES 1 and 4, located at the rear of the cartridge loading well. The indexing mechanism comprises a shaft 55, at the upper end of which there is positioned a plate 56 retained in place by a nut 58. Slidably mounted above the nut 58 is a detent 60 having a guide pin 62 secured at the rear thereof, the pin 62 extending through a hole formed in an upwardly extending rear portion 64 of the plate 56. A spring 66 normally urges the detent 60 forwardly. The forward end 68 of the detent 60 is suitably shaped with a sloping upper surface so that the cartridges can move freely past it when they travel in the downward direction but are firmly engaged by it when they are urged in an upward direction. Means including gear 70 are provided for pivoting the detent 60 out of the way so that a second cartridge may be moved up into the playing position. The plate 56 is provided with an outwardly extending detenting portion 72, FIGURE 1, oriented at approximately 30° from the forward end 68 of the detent. In FIGURE 4 several cartridges are shown, three (3) cartridges 74, 76 and 78 are particularly referred to and the cartridge 76 is illustrated as being in the play position. The portion 72 cooperates with the detent 60 so that when the detent 60 is pivoted to permit intermediate cartridge 76 to move out of the play position, the plate 56 is also pivoted moving detent 72 so that it prevents cartridge 78 from moving upwardly with cartridge 76 and by-passing the play position. However, when the indexing mechanism is moved in the reverse direction, the cartridge 78 is then permitted to move up into the play position formerly occupied by cartridge 76. Each of the cartridges is provided with an outwardly extending annular rim portion 79 which engages the detent forward end 68, and extending portion 72 of plate 56.

The loading platform is cut away at area 80 FIGURE 1, as shown to clear the detents 60 and 72.

The gear 70 keyed to shaft 55 engages a rack 82 connected to the plunger 84 of a solenoid 86 (FIGURE 1). When the solenoid 86 is energized, the plunger 84 is drawn into it and rotates the shaft 55 to index the retained cartridge 76 on the platform out of the playing position level with the pull member 34.

As disclosed in application 837,716, the shaft 55 (FIGURE 4) is capable of limited vertical movement, and normally is urged downwardly by a spring 87, but may be shifted upwardly under the pressure of a cartridge (for instance, cartridge 76) held in the play position. The object of this arrangement is that when cartridges are loaded in the machine, shaft 55 is urged upwardly to close electrical contacts 89 closing an electrical circuit for operation of the machine.

Although this arrangement has many advantages, it is apparent that a heavy object may be inadvertently placed on top of cartridge 74 causing the indexing mechanism 54 to shift downwardly moving cartridge 76 out of the playing position. If the object is heavy enough, the downward pressure may be sufficient to displace detent 68 rearwardly permitting cartridge 74 to bear against cartridge 76, or even displace it. In such an instance, it can be seen that a tape being played may be seriously damaged, and the following disclosure relates to novel structure for preventing such damage.

Pivoting about a post 88 behind the indexing mechanism 54 is an escapement lock, FIGURES 1 and 4, broadly designated by the numeral 90. Generally, it comprises a U-shaped plate member 92 having sides horizontally oriented and provided with holes through which the post 88 extends. Forward corners of the U-shaped member facing the indexing mechanism 54 are provided with cut-out areas 94 which cooperate with the guide pin 62 to provide surfaces arranged to act as stops below and behind the guide pin 62, as shown in FIGURE 4. This structure functions to prevent the guide pin 62 and detent 60 from being displaced vertically downwardly under pressure inadvertently applied to the loaded cartridges, and to lock the guide pin and detent 60 in a forward position to prevent inadvertent downward pressure from being applied to the cartridge being played. For instance, if an object is placed on top of cartridge 74, detent 60 will not move downwardly and cartridge 74 will be securely supported, preventing cartridge 76 from being displaced from the playing position and causing damage to the tape being played.

The escapement lock 90 is provided with an arm 96, FIGURE 1, connected to a linkage 98 actuated by the actuating lever arm 52 mentioned above with respect to the lock 40 for the tape leader 22 and pull member 34, and is normally urged out of a locking position by the spring 53.

At the rear of the indexing mechanism 54 an L-shaped member 100, FIGURES 1 and 4, is held on guide pin 62 between the upwardly extending rear portion 64 of plate 56 and spring 66. From FIGURE 1, it is apparent that as the indexing mechanism pivots about shaft 55 under actuation by the solenoid, the L-shaped member is similarly pivoted to the position shown in dotted lines.

Figure 2:
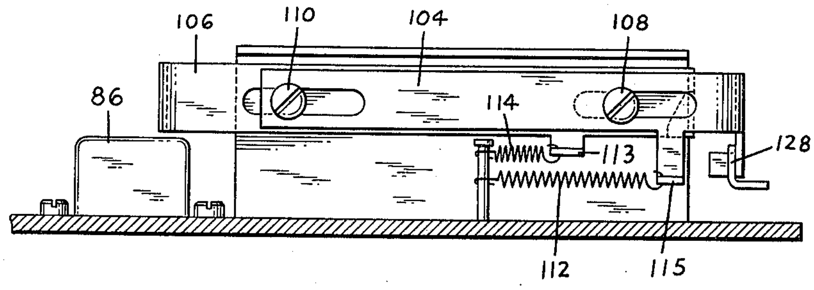
FIGURE 2 is a side view taken along line 2—2 of FIGURE 1.

On a side 102 of the well, FIGURE 1, are mounted super-imposed slide members 104 and 106, FIGURES 1 and 2, slidingly and reciprocatingly mounted on posts 108 and 110, screwed into the side 102 of the well. Each slide member is biased towards the rear of the machine by springs 112, and 114. The inner slide member 106 is generally U-shaped having one portion 109 which is adapted to be contacted and urged forwardly, against the action of the spring means 114 by the L-shaped member 100. The other outer slide member is also adapted to be urged forwardly against the spring means 112 by contact between portions 113 and 115, FIGURE 2, of the respective members. It can be seen that when inner slide 106 is in its forward most position, outer slide 104 is also shifted forwardly, but that slide 106 can be in its rear most position while slide 104 is in its forward most position.

Figure 5:
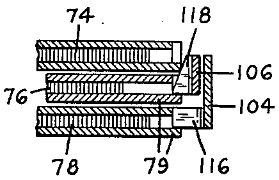
FIGURE 5 is a section view taken along the line 5—5 of FIGURE 1.

The outer slide member 104 is provided with a rectangular flange portion 116 illustrated in FIGURE 5, while the inner slide member 106 is provided with a substantially triangular cartridge locking flange portion 118. Referring to FIGURE 5, there are illustrated three cartridges, 74, 76 and 78, the upper cartridge 74 being one already played, the lower cartridge 78 being positioned for successive play, the intermediate cartridge 76 being in play position. The cartridges 74, 76 and 78 shown in FIGURE 5 correspond to the same numbered cartridges illustrated in FIGURE 4, and the annular outwardly extending rims 79 of the cartridges engage the flanges 116 and 118. From FIGURE 5 it is apparent that the lower rectangular flange portion 116 of the outer slide member 104 prevents cartridges beneath the one being played from pressing against the one being played. The upper triangular portion 118 of the inner slide member 106 serves to hold the cartridge being played in position, the upper sloping surface being shaped so that cartridges can move freely past it when forced into the well, but also to hold cartridge 74 away from cartridge 76.

It is now apparent that the L-shaped member 100 actuates the inner slide member 106 having the triangular shaped portion 118 retaining the cartridge 76 being played, so that as the indexing mechanism 54 is pivoted to release the cartridge being played, the inner slide member 106 is simultaneously actuated to release the opposite side of the cartridge. This permits the cartridge 76 to move upwardly out of the play position. At the same time slide member 104 is shifted to permit cartridge 78 to move up into the play position.

In the front of the machine, an actuating lever 120, FIGURE 1, of which lever arm 52 is a part, is pivotally seated on a post 122 mounted on the machine. Attached to one arm 124 of the lever is a play button 126 as shown. The arm 124 is provided with a flange portion 128, FIGURES 1 and 2, which is suitably linked to the outer slide member 104. The arm 52, described with respect to the tape leader lock 40 and the escapement lock 90 comprises the opposing arm of the actuating lever 120.

The object of the flange 128 is to hold the cartridge engaging flange 116 (FIGURE 5) away from the cartridge loading well when the play button 126 is in its non-depressed position to permit cartridges to be loaded into the well.

Operation of the mechanism should now be apparent. The well 14 is loaded by forcing a stack of cartridges down over loading post 16. The play button 126 is in the non-depressed position with cartridge locking flange 116 removed from the well, and the detent 60 is in the position shown in FIGURE 1, so that the cartridges may be easily forced past the detent 60. The cartridge locking flange 118 of slide member 106 is in its rear most position, urged by spring 114, but the cartridges may readily be forced past it by virtue of its sloping upper surface. In the non-depressed position of the play button, the pull member 34 of tape leader 22 is also locked in by lock 40. After loading, the top cartridge of the stack is automatically and accurately seated in the play position, the outwardly extending annular rim 79 of the cartridge engaging the forward end 68 of detent 60, FIGURE 4, and flange 118 of the slide member 106, FIGURE 5. At this stage the play button 126 is depressed causing flange 116 of outer slide 104 to engage the next lower cartridge, causing the tape leader lock 40 to be moved out of its locking position, releasing pull member 34, and causing the escapement lock 90 to be pivoted locking the detent 60 in its forward position to prevent inadvertent downward pressure against the cartridge being played. A latch arrangement (not shown) is provided to hold the play button in the depressed position. After the play and rewind cycle is completed, the solenoid 86 is caused to pivot the indexing mechanism 54, which forces the inner slide 106 to move cartridge locking flange 118, FIGURE 5, out of engagement with the cartridge being played. Slide 106 in this movement carries with it outer slide 104 thereby moving flange 116 out of engagement with the next lower cartridge. Pivoting of the indexing mechanism also moves the forward end 68 of detent 60 out of engagement with the top cartridge, all of this permitting the upward force on the stack of cartridges to move said next lower cartridge upwardly forcing the cartridge already played above the cartridge engaging surfaces of detent 60 and locking flange 118 of slide 106. The upward movement is, however, arrested by detent 72, FIGURE 1, which has been pivoted so as to engage said next lower cartridge. The solenoid is arranged so that at this point, the indexing mechanism is pivoted in the reverse direction, permitting said next lower cartridge to move upwardly into the play position to engage detent 60. At the same time, the inner slide member 106, now released, is actuated by spring 114 to cause locking flange 118 to engage said next lower cartridge now in the playing position, and slide 104, also released, engages the cartridge below that in the playing position by flange 116. Escapement lock 90 is again engaged by pin 62 of indexing mechanism 54 so that the indexing mechanism is locked against possible displacement of the cartridge in the playing position.

From the above description, it is apparent that the present invention provides not only an extremely effective way of indexing cartridges for a tape recording and reproducing machine, but also a locking arrangement by which the tape leader for the tape is automatically locked when desired, and an interlocking arrangement by which the cartridge being played is securely held and accurately locked in the play position, while the next lower cartridge below the one being played is also locked. In summary, the invention provides a novel and extremely effective way of insuring that the cartridge being played will be securely held and accurately located in the play position without danger of being inadvertently displaced.

Although the invention has been described with reference to specific means for practicing the invention, it is apparent that many modifications may be made by one skilled in the art, and accordingly, it is intended that the scope of the invention be limited only as defined in the following claims.

I claim:

1. In a tape recording-reproducing apparatus, a combination of means forming a tape cartridge receiving well, platform means slidably mounted in said well, means urging said platform means upwardly in said well, indexing means operable to index tape cartridges on said platform means successively to a reference position, means for locking said indexing means against inadvertent movement to prevent displacement of tape cartridges while in said reference position and means operative with said locking means to release a cartridge tape leader normally retained in a locked position.

2. A tape recording-reproducing apparatus, the combination of means forming a tape cartridge receiving well, upstanding guide means centrally disposed in said well, platform means slidably mounted on said guide means, means urging said platform means upwardly in said well, indexing means adapted to cooperate with a cartridge on said platform means to retain said cartridge at a predetermined level and to support cartridges above said cartridge so retained in a manner to prevent their bearing on said cartridge, said indexing means comprising detent portions operatively engaging opposite sides of said cartridge, means for moving said detent means to release said cartridge and to retain another cartridge at said predetermined level, and means for locking said indexing means against inadvertent movement and displacement of said cartridge retained at said predetermined level.

3. In a tape recording-reproducing apparatus, the combination of means forming a tape cartridge receiving well, upstanding guide means centrally disposed in said well, platform means slidably mounted on said guide means, means urging said platform means upwardly in said well for successive play of a multiple number of cartridges loaded in said well, indexing means adapted to cooperate with one cartridge on said platform means to retain said cartridge at a predetermined level, said indexing means comprising detent portions operatively engaging opposite sides of said one cartridge and supporting cartridges above said one cartridge, means for locking said indexing means against inadvertent displacement of said one cartridge retained at said predetermined level during a play cycle of sad cartridge, means for moving said detent means to release said one cartridge and to retain another cartridge at said predetermined level, tape leader means normally held against said well at said predetermined level for unwinding a spool of tape of a cartridge at said level, and means operable with said locking means for locking and unlocking said tape leader means against said well and arranged whereby said leader means is locked during loading of cartridges in said well, but unlocked during said successive play.

4. In a tape recording-reproducing apparatus according to claim 3 wherein said tape leader means comprises shoulder portions adapted to seat against cooperating portions of said well, said tape leader locking means comprising a reciprocating member arranged to lock said tape leader means against said well.

5. In a tape recording-reproducing apparatus, the combination of means forming a tape cartridge receiving well, platform means slidably mounted in said well, means urging said platform upwardly in said well, indexing means operable to index tape cartridges on said platform successively to a reference position, the said indexing means comprising detent portions operatively engaging opposite sides of a cartridge retained at said reference position, a play button, means for locking said indexing means against inadvertent movement and displacement of a cartridge being held at said reference position, and means linking said play button with said locking means such that when said play button is depressed, the said locking means operatively engages said indexing means during a play cycle of said cartridge being retained.

6. In a tape recording-reproducing apparatus, the combination of means forming a tape cartridge receiving well, platform means slidably mounted in said well, means urging said platform means upwardly in said well, indexing means adapted to cooperate with a cartridge on said platform means, means to retain the cartridge at a predetermined level, said indexing means comprising detent portions operatively engaging opposite sides of said cartridge, means for locking said indexing means against inadvertent movement and displacement of a cartridge retained at said predetermined level, a play button, means linking said play button with said locking means so that when said play button is depressed said locking means operatively engages said indexing means during a play cycle, and means for moving said detent means to release said cartridge and to retain another cartridge at said predetermined level.

7. In a tape recording-reproducing apparatus according to claim 6 further including a second indexing means engaging the next lower cartridge below the one retained at said predetermined level to hold said lower cartridge away from the one at said predetermined level, and means operably linking said second indexing means with said means for moving said detent to permit said lower cartridge to move up into said playing position.

8. In a tape recording-reproducing apparatus, the combination of means forming a tape cartridge receiving well, platform means slidably mounted in said well, means urging said platform means upwardly in said well, indexing means comprising a first detent means adapted to cooperate with one side of a cartridge on said platform means to retain the cartridge at a predetermined level, means for pivoting said detent means to release said cartridge and to retain another cartridge at said predetermined level, said indexing means comprising a second detent means operatively engaging an opposite side of said cartridge retained at said predetermined level, and linkage means between said first detent means and said second detent means whereby said second detent means is actuated when said first detent means is pivoted.

9. In a tape recording-reproducing apparatus the combination of means forming a tape cartridge receiving well, platform means slidably mounted in said well, means urging said platform means upwardly in said well, indexing means comprising a first detent means adapted to engage one side of a cartridge on said platform and to retain the cartridge at a predetermined level, means for pivoting said detent means to release said cartridge and to retain another cartridge at said predetermined level, said indexing means comprising a second detent means operatively engaging the opposite side of said cartridge retained at said predetermined level, linkage means between said first detent means and said second detent means whereby said second detent means is actuated out of engagement with a cartridge when said first detent means is pivoted, a play button, means locking said first detent means against reciprocating movement and inadvertent displacement of a cartridge retained at said predetermined level, and means linking said play button with said locking means so that when said play button is depressed, said locking means operatively engages said indexing means during a play cycle.

References Cited by the Examiner

UNITED STATES PATENTS

| | | | |
|---|---|---|---|
| 2,561,503 | 7/51 | D'Ornellas ---------- | 242—55.13 |
| 3,100,090 | 8/63 | Goodell et al. ------ | 242—55.13 |

NORTON ANSHER, *Primary Examiner.*

STEPHEN W. CAPELLI, *Examiner.*